United States Patent [19]
Edwards

[11] Patent Number: 5,123,377
[45] Date of Patent: Jun. 23, 1992

[54] COLLAPSIBLE VEHICLE SAFETY RESTRAINT AND SEAT FOR PETS

[76] Inventor: Myrtis C. Edwards, P.O. Box 626, Olivehurst, Calif. 95961

[21] Appl. No.: 764,357

[22] Filed: Sep. 23, 1991

[51] Int. Cl.$^5$ .............................................. A01K 29/00
[52] U.S. Cl. ..................... 119/28.5; 119/96; 297/184; 297/255
[58] Field of Search ............ 119/96, 28.5; 5/94, 5/118; 297/254, 255, 256, 184; 224/275, 42.43, 42.45

[56] References Cited

U.S. PATENT DOCUMENTS

| | | | |
|---|---|---|---|
| 540,034 | 5/1895 | Swan | 297/256 |
| 1,912,514 | 6/1933 | Curtis et al. | 224/42.43 |
| 2,499,103 | 2/1950 | Love | 5/94 |
| 2,676,644 | 4/1954 | Fleisher et al. | 297/256 |
| 3,169,036 | 2/1965 | Spooner | 297/256 |
| 3,245,717 | 4/1966 | Levy | 297/254 |
| 4,010,880 | 3/1977 | Guillot-Munoz | 119/28.5 |
| 4,512,286 | 4/1985 | Rux | 119/96 |
| 4,597,359 | 7/1986 | Moorman | 119/28.5 |
| 4,883,315 | 11/1989 | Ferguson | 297/184 |
| 4,923,249 | 5/1990 | Mattox | 297/184 |

FOREIGN PATENT DOCUMENTS

| | | | |
|---|---|---|---|
| 167120 | 4/1934 | Switzerland | 297/256 |
| 293132 | 7/1928 | United Kingdom | 297/256 |

*Primary Examiner*—Gene Mancene
*Assistant Examiner*—Todd E. Monahan
*Attorney, Agent, or Firm*—Richard C. Litman

[57] ABSTRACT

A collapsible, folding vehicle seat and safety restraint apparatus for animals includes a padded seat pivotally extended from a generally vertically disposed seat back which is removably affixed to an otherwise conventional vehicle seat back by a pair of suspension hooks. An adjustable animal restraint harness, such as a chain, is attached to the upper end of the apparatus seat back. An opaque or translucent sun shade is securable, as by clips, to the front of the apparatus seat.

14 Claims, 4 Drawing Sheets

COLLAPSIBLE VEHICLE SAFETY RESTRAINT AND SEAT FOR PETS

FIELD OF THE INVENTION

The present invention relates to a platform seat apparatus for transporting animals in vehicles.

DESCRIPTION OF THE PRIOR ART

There are millions of pet owners in the country. Often pet owners like to take their pets along with them in their vehicles. This often places both the driver and pet in a potentially risky situation. If the driver is forced to make a sudden maneuver the pet may be thrown, thus causing injury to the pet and possibly to the driver as well. Also, a pet freely roaming about a vehicle may distract a driver, thus creating a dangerous situation.

In the past, two methods have been employed to restrain an animal in a vehicle. One is a harness that is useful on larger animals and the other is a basket-like carrier for smaller animals.

U.S. Pat. No. 2,869,146 shows a platform for dogs which attaches over the top of a car seat. There is no means provided to secure the dog onto the platform in case of a sudden stop.

U.S. Pat. No. 3,310,034 shows a safety harness and collar arrangement. One disadvantage of this device is that is allows the animal to sit directly on the seat fabric, thus leaving the seat open to damage by scratching or soiling.

U.S. Pat. No. 5,005,526 shows a collapsible animal seat anchored by a vehicle seat belt. One disadvantage of this device is that it is closed in on all four sides, thereby preventing adequate air circulation and increasing the chances of the animal overheating. Another disadvantage is that the sole means of anchoring the carrier is by a vehicle seat belt. In many newer vehicles the seat belt consists both of a lap belt and a shoulder harness as a single unit. Such an arrangement would make anchoring the carrier very difficult.

U.S. Pat. No. Des. 245,716 shows a car seat for domestic animals. This seat provides a means for anchoring the seat over the top of a vehicle seat and provides ventilation holes. However, the legs on the carrier would leave indentations in and possibly puncture the vehicle seat.

None of the above inventions and patents, taken either singly or in combination, is seen to describe the instant invention as disclosed and claimed.

SUMMARY OF THE INVENTION

Accordingly, it is a principal object of the present invention is to provide a collapsible vehicle safety seat for pets to enhance the safe transportation of animals in motor vehicles.

It is another object of this invention to provide a vehicle safety seat for pets which allows the owner to secure the pet in such a manner that allows the pet a certain degree of freedom, while preventing the pet from wandering about the vehicle.

It is a further object of this invention to provide a vehicle safety seat for pets which will provide adequate air circulation and protection from the sun, so that the pet does not become overheated.

It is another object of the present invention to provide a vehicle safety seat for pets which collapses against the vehicle seat back for easy storage.

It is a further object of this invention to provide vehicle safety seat for pets which may be affixed to a vehicle seat by means of hooks which fit over a vehicle seat back top, thus to present a platform seat suspended over the seat of the vehicle so that the pet is at a comfortable elevation.

A collapsible vehicle safety seat for animals is described that has a horizontal platform seat pivotally connected at one end to a vertical apparatus seat back having a peripheral frame. Lower ends of the seat back frame are affixed to the horizontal seat and are forwardly angled so that they attach at a position forward of the rear of the horizontal seat. This arrangement allows the seat and back to be compactly folded together with the seat and back almost parallel one another when the apparatus is not in use; conveniently, the apparatus may be folded while suspended from the vehicle seat back and left in place in the vehicle. Link assemblies positioned adjacent the pivotal interconnection of seat and back are dimensioned and arranged so that the platform seat is disposed at approximately a right angle with respect to the apparatus seat back. The seat and back include transverse slats to support removable bottom and back cushions.

Left and right lateral restraint arms are affixed at one end to the sides of the apparatus seat back. The other end of each restraint arm has a downward hook shape. Conveniently, these arms may be used as arm rests by the vehicle driver and a passenger, the apparatus being placed between them. Also, the center lap belt of the vehicle may be passed between the link assemblies and the apparatus seat back frame lower ends and latched conventionally to provide further security of the apparatus. Of course, the apparatus could be mounted on the rear seat of a vehicle and be similarly secured by a rear seat safety lap belt of the horizontal frame. Pivoting fastening links extend from both lateral restraint arms to the sides of the platform seat. The positions at which the links affix on the platform seat are slightly forward of the position at which they affix onto the lateral restraints. This arrangement aids the stability of the apparatus by preventing it from collapsing accidentally.

Two hooks are affixed to the rear of the vertical seat back and are fitted across the top of the vehicle seat back, thereby suspending the apparatus. The hooks are pliable so that they may be bent to accommodate a variety of vehicle seats.

An adjustable animal harness may be attached to the vertical seat back by means of a tether, which may be a short length of chain or a leash. This arrangement allows the animal some freedom of movement, but prevents the animal from wandering about the vehicle.

A sun shield of opaque or translucent material may be affixed at the front of the horizontal frame by clips or the like. This shield serves a two fold purpose: first, it protects the animal from sunlight coming into the vehicle, thereby helping to keep the animal cool; and second, it helps to reduce trauma to the animal in the event of a sudden stop.

BRIEF DESCRIPTION OF THE DRAWINGS

Further objects and advantages of the present invention will become readily apparent by reference to the following detailed specification and drawings in which.

DETAILED DESCRIPTION OF THE PREFERRED EMBODIMENTS

Figure 1:
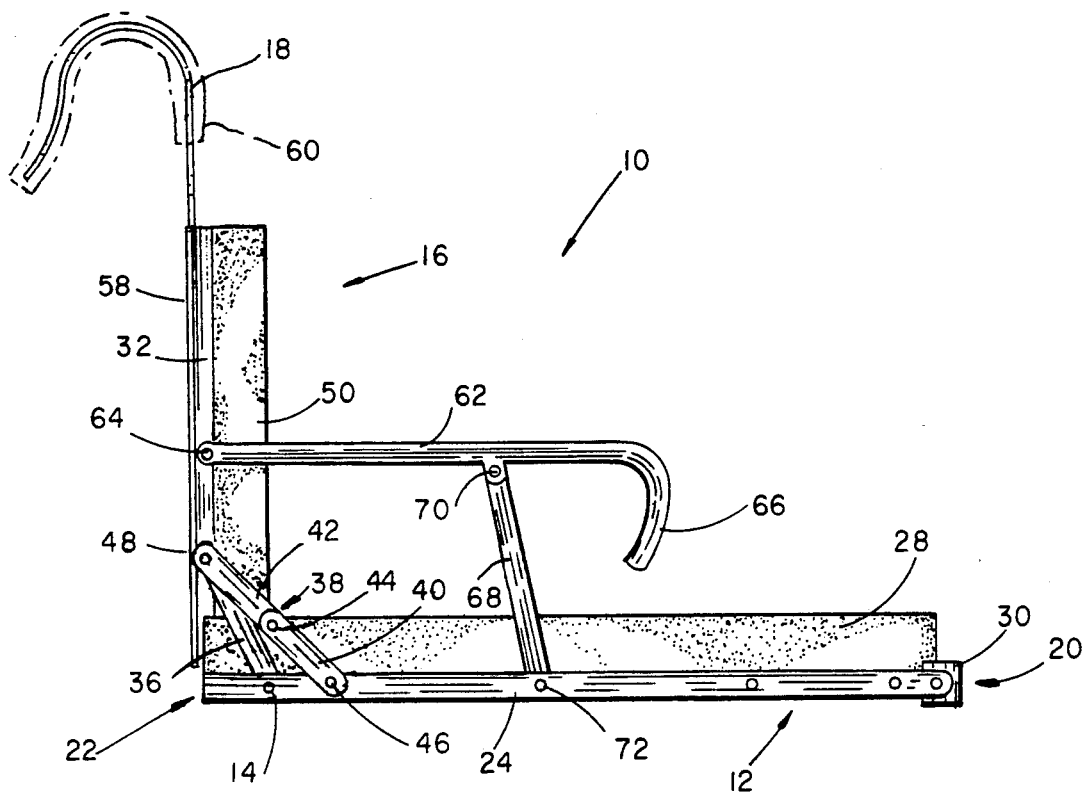
FIG. 1 is a side elevation view of a preferred embodiment of the present invention.
Figure 2:
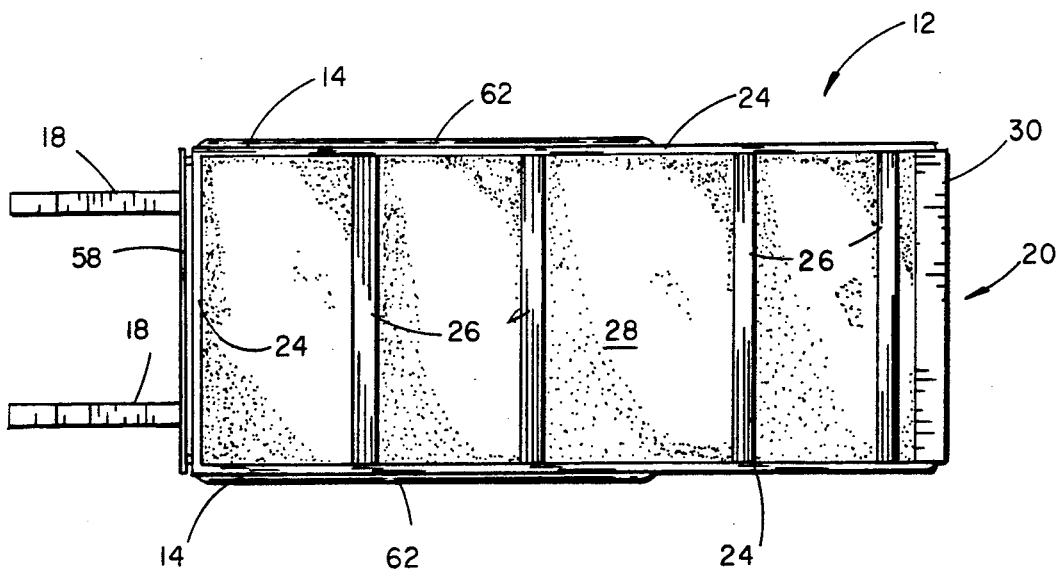
FIG. 2 is a bottom plan view of the invention as shown in FIG. 1.

Referring now to the drawings by reference character and, in particular, to FIG. 1 and 2 thereof, a preferred embodiment of the invention is shown at 10 including a generally horizontally disposed, rectangular platform seat 12 pivotally secured at 14 to a generally rectangular vertical apparatus seat back 16 having a pair of upwardly and rearwardly extending hooks 18 for suspending the apparatus 10 from an otherwise conventional vehicle seat back in a manner to be described below. Each hook 18 is preferably made of easily bent material such as metal so as to accommodate varying thicknesses of vehicle seat backs B. For example, automobile seat backs may be several inches thick while the seat backs of conventional pickup trucks are only a few inches thick. Thus, the invention may be moved from one vehicle to another and the hooks 18 simply rebent to accommodate the vehicle seat back upon which the apparatus is mounted. Horizontal seat 12 has a forward end 20 and a rear end 22 adjacent vertical back 16. The horizontal seat 12 is easily made of low cost materials and includes a peripheral frame 24 crossed braced by a plurality of slats 26 which serve to support a removable cushion 28 made from any one or more of a wide variety of materials known in the art. If desired, front end 20 may have a bumper 30 thereacross made of wood or other suitable material.

Vertical back 16 is constructed somewhat similarly to horizontal seat 12 and has a rectangular shape defined by a pair of vertical side frames 32 joined together at the top by a horizontal frame piece 34; the frame pieces 32, 34 may be made of one piece construction from, by way of example, a piece of bar stock appropriately bent to the desired shape. At the lower ends of side frames 32 are formed a pair of extensions 36 which are extended forwardly with respect to rear end 22 of platform seat 12, the lower ends of extensions 36 being pivotally secured to frame 24 of seat platform 12 at 14, 14. This construction permits the seat 12 to be folded out of the way against and substantially parallel with vertical seat back 16 as shown by the dot and dash and solid lines of FIG. 5. Referring again to FIG. 1, the generally right angle relationship of platform seat 12 with vertical seat back 16 is assured by a pair of link assemblies 38 each made of two link members 40, 42 pivotally joined together at 44, member 40 being pivotally attached to frame 24 at 46 and link member 42 being pivotally attached to side frame 32 at 48. Also, the provision of link assemblies 38 imparts rigidity of construction to the apparatus, particularly when in use, supporting a pet. Additionally, the arrangement of extensions 36 and link assemblies 38 provides a space therebetween, as best seen in FIG. 1. If desired, the conventional safety lap belt (not shown) provided with the front or rear seat of a vehicle may be passed through the space described and latched to provide further security of the apparatus.

A second removable cushion 50 may be provided for vertical seat back 16 and is made of any suitable material.

Figure 3:
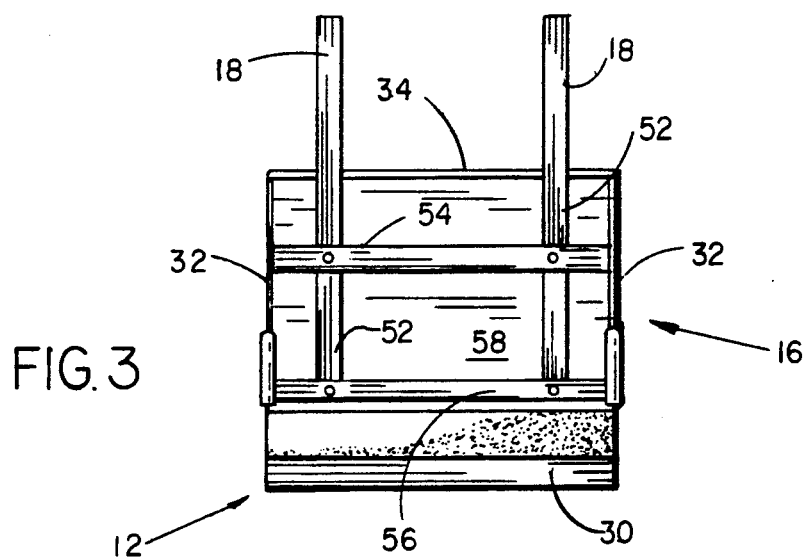
FIG. 3 is a front elevation view of the invention as shown in FIG. 1.
Figure 5:
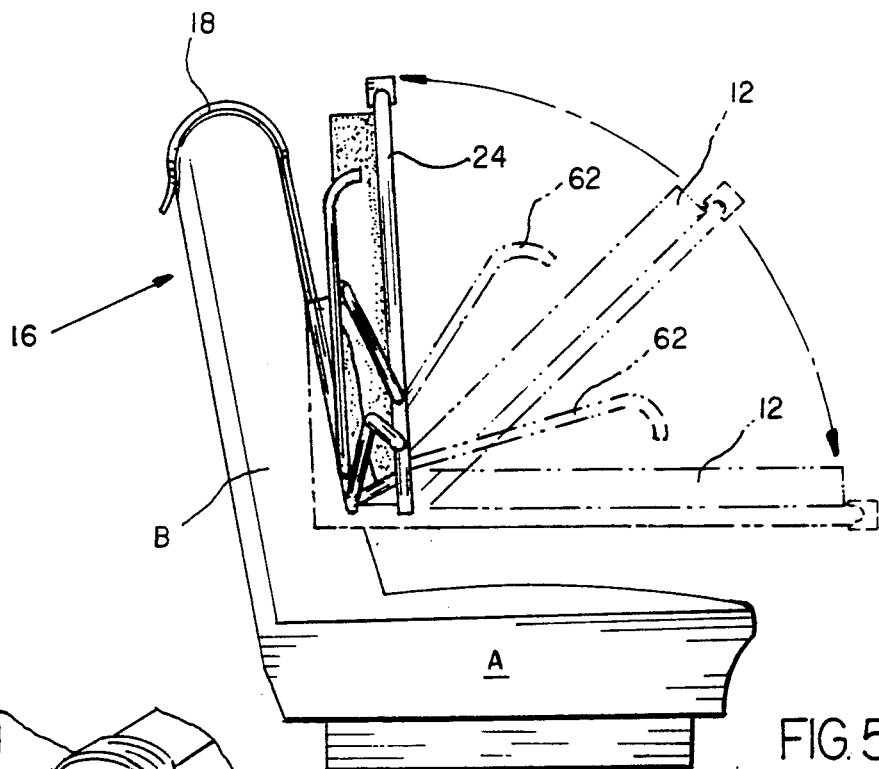
FIG. 5 is a side elevation view of the invention as shown in FIGS. 1-4, the solid lines indicating the invention folded against a conventional vehicle seat back.
Figure 7:
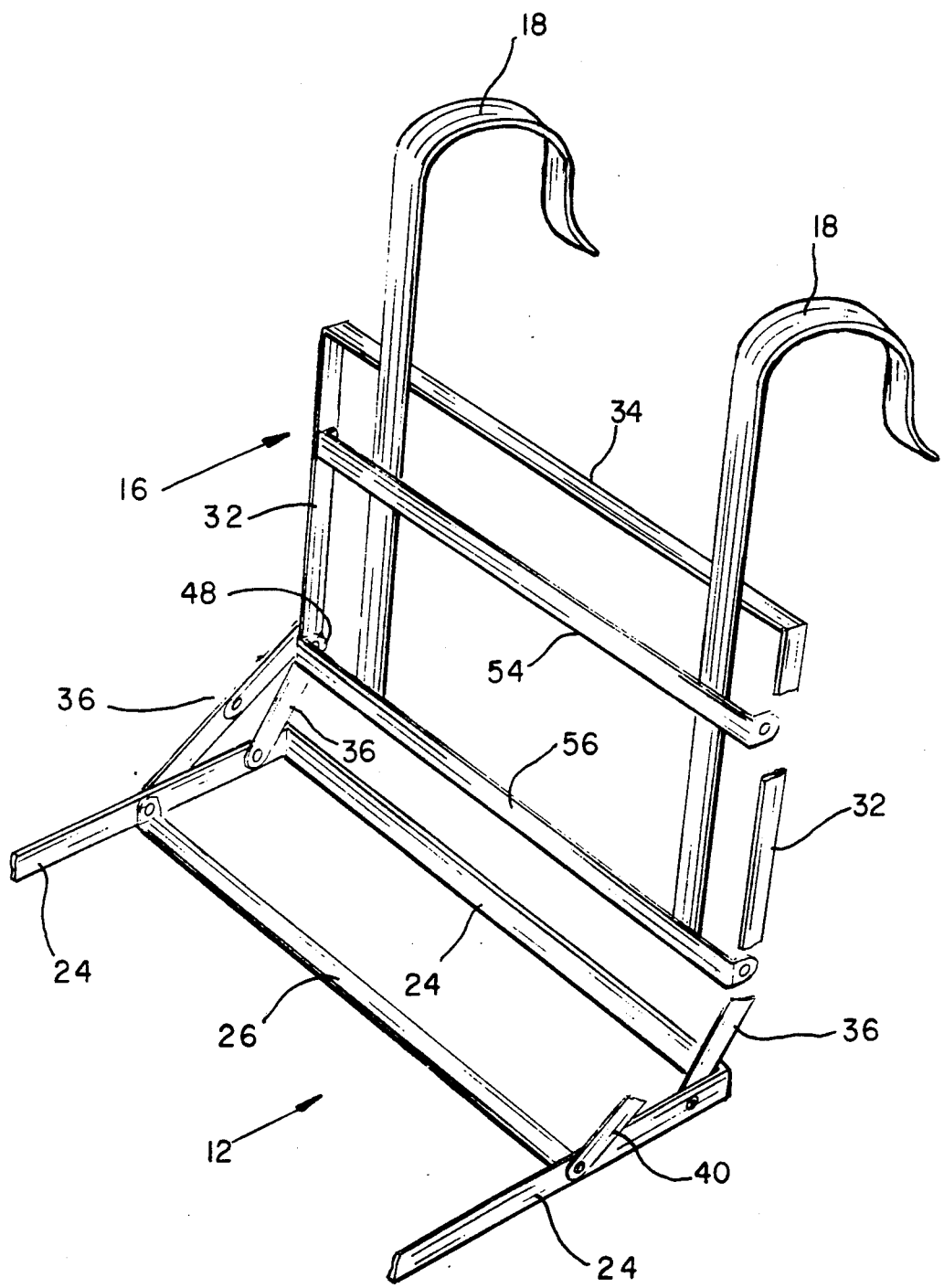
FIG. 7 is a fragmentary, partial perspective view of the invention showing details of construction.

With particular reference to FIGS. 3 and 7, the construction and function of suspension hooks 18 will now be described. Hooks 18 include depending lower segments 52, 52 attached, as by bolts or tack welds, to a first horizontal slat 54 fixed to side frame pieces 32, 32 and to a second horizontal slat 56 secured, conveniently, to pivot points 48. As shown, lower segments 52 terminate at second horizontal slat 56. This construction is sufficiently rigid to permit the platform seat 12 to be suspended above and out of contact with the vehicle seat A as is best shown in FIG. 5. Thus, wear and tear on the vehicle seat A will be prevented when the invention is in use.

Further construction details of vertical seat back 16 may include a protective shield 58 on the back of vertical seat 16 to reduce wear and tear on the vehicle seat back B. Also, a protectant in the form of a coating or sleeve 60 made of a rubbery or cushion material may be provided for the curved ends of hooks 18 as shown by dot and dash lines in FIG. 1. Protectant 60 reduces wear and tear on the vehicle seat back B.

Figure 4:
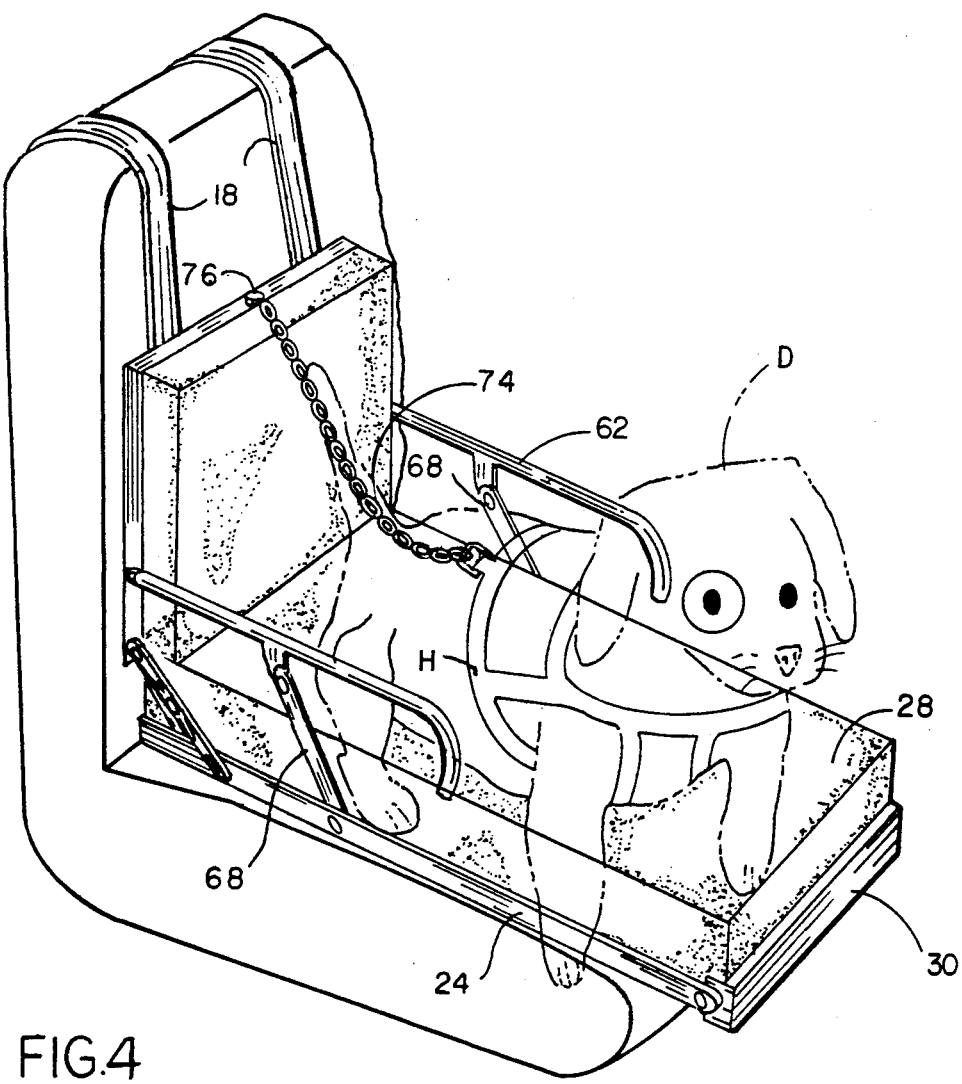
FIG. 4 is a perspective view of the invention in use and as shown in FIGS. 1-3.

With reference to FIGS. 1 and 4, a pair of lateral restraints 62 are located on each side of the apparatus. Each restraint 62 includes an arm pivotally secured at one end 64 to a side frame 32 of seat back 16. Each restraint 62 is in the form of an arm, curved downwardly at its free front end as shown at 66. Each arm restraint 62 is supported by a link arm 68 pivotally affixed at one end 70 to a mesial portion of arm restraint 62 and at its other end to platform seat frame 24 at 72. Each link arm 68 is angled forwardly with respect to front end 20 of platform seat 12 so that the restraint arm 62 will not collapse when the apparatus is unfolded and used. Arms 62 may be made of tubular stock material, if desired. When the invention is used, it may, for example, be placed in the vehicle suspended from a central portion of a vehicle seat back B and the arms 62 may be employed as arm rests for the driver and a passenger seated on the other side of the apparatus from the driver.

The invention is shown in use in FIG. 4 with a pet D seated on the platform seat 12. A comfortable and otherwise conventional harness H on the pet D is attached by a tether or relatively short length leash or chain 74 having its other end 76 affixed to a central top portion of frame piece 34 of vertical seat back 16. This arrangement permits the pet some freedom of movement but prevents the pet from roaming freely about the vehicle.

With reference to FIG. 5, it is seen that the apparatus when folded lays neatly against the conventional, slightly angled vehicle seat back B. When the apparatus is unfolded for use, as shown in dot and dash lines in the same FIG. 5, the entire apparatus will rock backward slightly with the bottom of the apparatus indenting the vehicle seat back B somewhat. When a pet D is seated on platform seat 12, the apparatus will rock back slightly farther so that the seat 12 will be disposed at generally a horizontal attitude, over the vehicle seat A. This horizontal disposition of platform seat 12 provides a very comfortable support surface for the pet.

Figure 6:
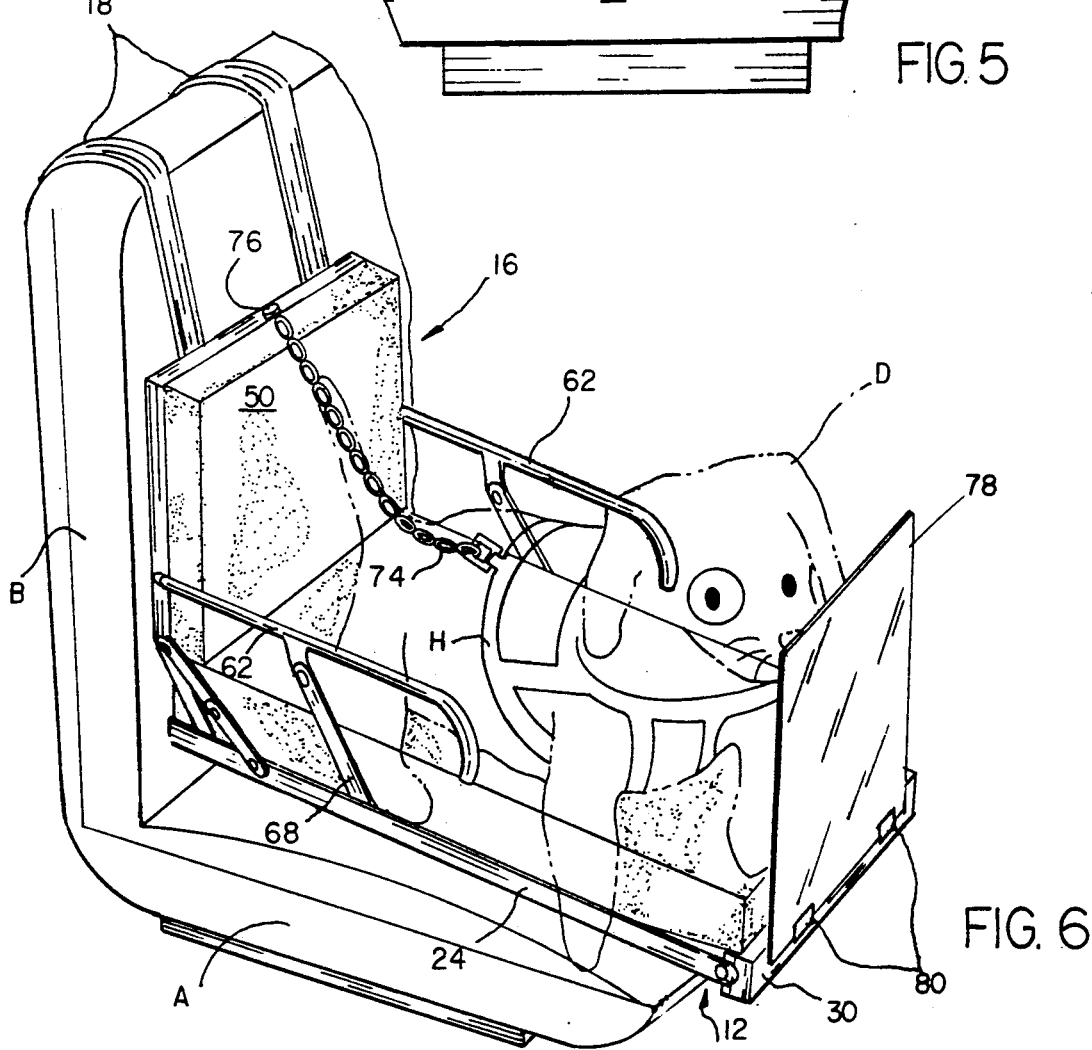
FIG. 6 is a perspective view of another embodiment of the present invention.

Further pet comfort is assured by an optional sun shade 78 illustrated in FIG. 6. Shade 78 may be opaque or translucent and may be made of any suitable rigid or shape retaining material such as plastic, cardboard, metal or the like. Shade 78 may be mounted on front bumper 30 of seat platform 12 for ready detachment when the shade is not needed by a pair of clips 80, for example.

A particular advantage of the present invention over the prior art is the provision of folded storage of the apparatus in place in the vehicle when not in use; the apparatus does not need to be removed. The apparatus folds into a very neat and compact storage configuration as is best seen in FIG. 5.

It is to be understood that the present invention is not limited to the sole embodiment described above, but encompasses any and all embodiments within the scope of the following claims.

I claim:

1. A collapsible, folding vehicle seat and safety restraint apparatus for animals comprising:
    a. a generally horizontal, rectangular platform seat including a peripheral frame having front and rear ends:
    b. a generally vertically disposed, rectangular apparatus seat back having a top and bottom and including frame means along at least the opposed vertical side edges thereof;
    c. a pair of lateral restraint means, one to each side of said apparatus, each including an arm pivotally attached at one end to said vertical side edge frame means of said apparatus seat back, and link means interconnecting said arm mesially thereof to said platform seat peripheral frame at a point between the front and rear ends thereof;
    d. means pivotally attaching said platform seat to said apparatus seat back and including means forming integral extensions of said seat back frame means near the bottom thereof and angled forwardly with respect to a plane defined by said opposed vertical side edge frame means and pivotally secured to said platform seat peripheral frame forwardly of the rear end of said seat, and a pair of link assemblies secured to said seat back frame means adjacent said extensions, beneath, and separate from, the pivotal attachment of said arms of said lateral restraint means, to said seat back frame means and to said platform seat frame forwardly of the pivotal securement points of said extensions, and rearwardly of, and separate from, the connection point of said link means of said lateral restraint means to said platform seat peripheral frame; and
    e. a pair of suspension hooks extending upwardly and rearwardly from said apparatus seat back and so configured and arranged as to suspend said apparatus from an otherwise conventional vehicle seat back;
whereby, in use, said platform seat may be folded downwardly from said apparatus seat back to a position suspended over a vehicle seat thus to support an animal and, after use, said platform seat may be folded upwardly against and substantially parallel with said apparatus seat back.

2. The invention as claimed in claim 1, further comprising an animal restraint harness and flexible means connecting said harness to said apparatus seat back top.

3. The invention as claimed in claim 1, further comprising sun shade means mounted to and extending upwardly at substantially a right angle from the front end of said platform seat.

4. The invention as claimed in claim 3 wherein said sun shade means comprise a generally rectangular, relatively stiff and self supporting sheet of opaque material.

5. The invention as claimed in claim 1 wherein each said link means interconnecting said arm to said platform seat frame comprises a single link arm angled forwardly from said pivotally attached arm towards said platform seat front end.

6. The invention as claimed in claim 1 wherein each said arm is made of tubular material and includes a free forward end curved downwardly, thus to form an arm rest.

7. The invention as claimed in claim 1 wherein said platform seat peripheral frame further comprises a plurality of transverse slats arrayed thereacross to support a cushion means thereupon.

8. The invention as claimed in claim 1 wherein said apparatus seat back frame means includes a top member adjoining the opposed vertical side edge frame means, said top member and said vertical side edge frame means being of integral, one-piece construction.

9. The invention as claimed in claim 1 wherein said apparatus seat back includes at least one horizontal slat interconnecting said opposed vertical side edge frame means, said suspension hooks further including depending lower segments attached to said at least one horizontal slat thereby to impart rigidity of construction to said apparatus.

10. The invention as claimed in claim 9 further comprising a second horizontal slat interconnecting said opposed vertical side edge frame means at the junction of said link assemblies and said frame means, said suspension hook lower segments being secured to said at least one and said second horizontal slat thereby to further impart rigidity of construction to said apparatus.

11. The invention as claimed in claim 1 wherein said apparatus seat back further comprises a sheet of protective material affixed to the rear surface thereof thereby to reduce wear and tear on the surface of the vehicle seat back on which the apparatus is mounted.

12. The invention as claimed in claim 1 wherein the surfaces of said suspension hooks are coated with a protectant thereby to reduce wear and tear on the surface of the seat back on which the apparatus is mounted.

13. The invention as claimed in claim 1 wherein each of said pair of link assemblies secured to said seat back frame and said platform seat frame comprise a pair of link members each having a first end pivotally secured to one of said seat back frame means or said platform seat frame and a second end pivotally attached to the second end of the other link member.

14. The invention as claimed in claim 1 wherein both said apparatus seat back and said platform seat are provided with cushion means on the forward and upper surfaces respectively thereof, thus to provide a comfortable bed for an animal when the apparatus is in use.

* * * * *